April 25, 1933.  E. H. McNEAL  1,906,171
GARDEN AND FLOWER HOE
Filed July 30, 1932
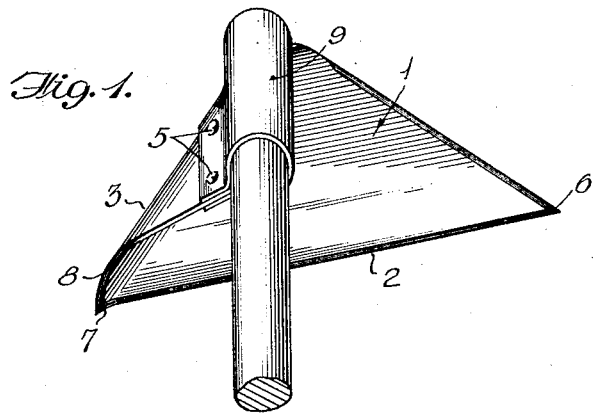
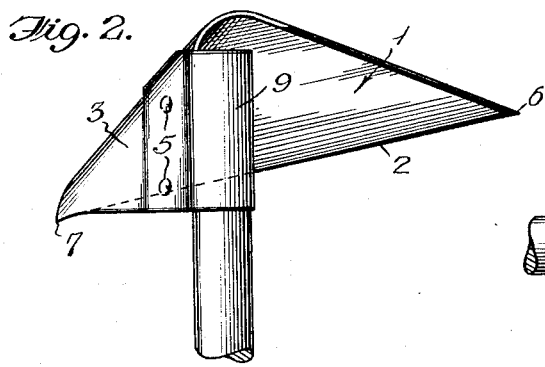
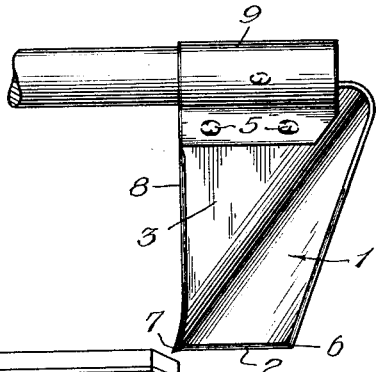
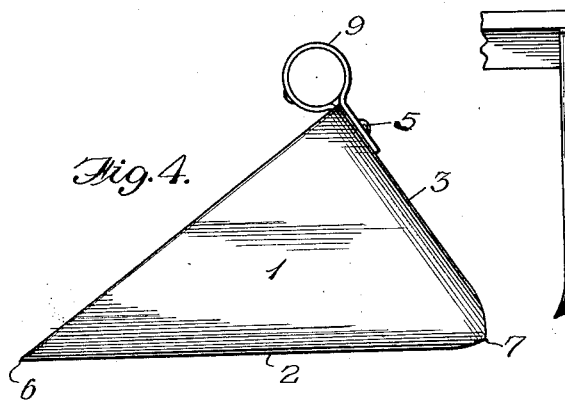
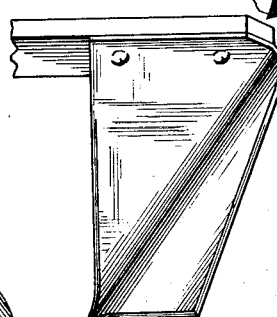
Inventor
Eli H. McNeal.
E. W. Anderson Son.
By
Attorney Patented Apr. 25, 1933

1,906,171

UNITED STATES PATENT OFFICE

ELI H. McNEAL, OF MUSKEGON, MICHIGAN, ASSIGNOR OF ONE-HALF TO MARTIN NEWALD, OF MUSKEGON, MICHIGAN

GARDEN AND FLOWER HOE

Application filed July 30, 1932. Serial No. 626,587.

The invention has relation to hand implements of the hoe type for cultivating and weeding purposes, having for an object to provide such an implement, having the usual straight edge blade portion and also an acute angle pointed cultivator and weeder tooth portion. Another object is to provide the blade with an angular intersecting bend forming an extra strong pointed tooth portion for rough work. Other objects and advantages will hereinafter appear.

The invention consists in the novel construction and combinations of parts as set forth in the appended claims.

In the accompanying drawing illustrating certain embodiments of the invention,

Figure 1 is a perspective view of the invention.

Figure 2 is a plan view of the same.

Figure 3 is a side view of the same.

Figure 4 is a front view of the same.

Figure 5 is a side view of a modification of the invention.

In the drawing, the numeral 1 designates the tool head, the planular triangular blade of which has the usual lower straight edge 2, said blade having at one end thereof a rearwardly and laterally bent triangular portion 3, the upper edge of which extends rearwardly of the blade and is located intermediately of the length thereof, being provided with perforations 4 for attachment screws or bolts 5.

The blade 1 has a lateral edge which intersects the straight edge 2 at an acute angle, thereby providing a cultivator and weeder tooth 6. The rearward and lateral bend 3 has a lateral edge which intersects the straight edge 2 of the blade at the end thereof opposite said tooth, the intersection being at about right angles, and forming a stronger cultivator and weeder tooth 7. This rearward and lateral bend 3 has a curved jointure with the blade 1 extending from top to bottom of the blade along the tooth 7 to strengthen said tooth. The lower straight edge 2 is sharpened as is also the lateral edge 8 of the rearward and lateral bend 3 and the lower portion of the lateral edge of the blade proper.

In Figures 1 to 4 of the drawing, the handle is provided with a ferrule 9 having spaced opposed jaws 10 gripping the upper perforated edge portion of the bend 3 and similarly perforated for the attachment screws or bolts. Or a welding connection may be used.

In Figure 5 of the drawing a modification is shown wherein the ferrule is omitted and the handle is attached directly to the upper edge portion of the bend 3.

The ferrule 9 may of course obviously be made integral with the bend 3.

I claim:

1. A hand implement of the hoe type, comprising a tool head having a blade provided with a lower straight edge, said blade having a lateral edge having an acute angle relation to and intersecting said straight edge to form a cultivator and weeder tooth, said blade having at the end thereof opposite said tooth a rearward bent portion having an upper edge located intermediately of the length of the blade and provided with a handle connection in line therewith.

2. A hand implement of the hoe type, comprising a tool head having a triangular blade provided with a lower straight edge, said blade having a lateral edge having acute angle relation to and intersecting said straight edge to form a cultivator and weeder tooth, said blade having at the end thereof opposite said tooth a triangular rearward and laterally bent portion having an upper edge located intermediately of the length of the blade and provided with a handle connection in line therewith.

3. A hand implement of the hoe type, comprising a tool head having a lower straight edge, said blade having at one end thereof a rearward bent portion having a lateral edge intersecting said straight edge to form a cultivator and weeder tooth, said bent portion having an upper edge located intermediately of the length of the blade and provided with a handle connection in line therewith.

4. A hand implement of the hoe type, comprising a tool head having a lower straight edge, said blade having at one end thereof a rearwardly and laterally bent portion having a lateral edge intersecting said straight edge to form a cultivator and weeder tooth, said bent portion having a curved juncture with said blade extending from top to bottom thereof along and strengthening said tooth and having an upper edge located intermediately of the length of the blade and provided with a handle connection in line therewith.

5. A hand implement of the hoe type, comprising a tool head having a blade provided with a lower straight edge, said blade having a lateral edge having an acute angle relation to and intersecting said straight edge to form a cultivator and weeder tooth, said blade having at the end thereof opposite said tooth a rearwardly and laterally bent portion having a lateral edge intersecting said straight edge to form a stronger cultivator and weeder tooth, said bent portion having a curved juncture with said blade thereby strengthening said tooth and having an upper edge located intermediately of the length of the blade and provided with a handle connection in line therewith.

In testimony whereof I affix my signature.

ELI H. McNEAL.